US010059390B2

(12) United States Patent
Gustafson

(10) Patent No.: US 10,059,390 B2
(45) Date of Patent: Aug. 28, 2018

(54) MID-ROLLER WITH REDUCED-FRICTION GUIDE

(71) Applicant: AGCO Corporation, Duluth, GA (US)

(72) Inventor: Alan D. Gustafson, Lakefield, MN (US)

(73) Assignee: AGCO CORPORATION, Duluth, GA (US)

( * ) Notice: Subject to any disclaimer, the term of this patent is extended or adjusted under 35 U.S.C. 154(b) by 0 days.

(21) Appl. No.: 15/550,057

(22) PCT Filed: Feb. 10, 2016

(86) PCT No.: PCT/US2016/017290
§ 371 (c)(1),
(2) Date: Aug. 10, 2017

(87) PCT Pub. No.: WO2016/130640
PCT Pub. Date: Aug. 18, 2016

(65) Prior Publication Data
US 2018/0022409 A1 Jan. 25, 2018

Related U.S. Application Data

(60) Provisional application No. 62/114,130, filed on Feb. 10, 2015.

(51) Int. Cl.
*B62D 55/14* (2006.01)

(52) U.S. Cl.
CPC ........... *B62D 55/145* (2013.01); *B62D 55/14* (2013.01)

(58) Field of Classification Search
CPC .............................. B62D 55/14; B62D 55/145
(Continued)

(56) References Cited

U.S. PATENT DOCUMENTS 3,997,217 A * 12/1976 Bandet ...................... B60B 3/06
301/5.1
5,141,299 A    8/1992 Korpi
(Continued)

FOREIGN PATENT DOCUMENTS

DE    3221756 A1 * 12/1983 ............. B62D 55/14
WO   2015/063547 A1    5/2015

OTHER PUBLICATIONS

UK Intellectual Property Office, International Search Report for related UK Application No. GB1503637.9, dated Aug. 18, 2015.
(Continued)

*Primary Examiner* — Kip T Kotter

(57) ABSTRACT

A mid-roller (30) for a tracked work vehicle has a shaft (44) and a pair of hubs (50) assembled about the shaft (44), each hub having a cylindrical housing (52) with a flange portion (66) projecting radially outward. Each mid-roller also has a pair of metallic roller wheels (70) mounted on the pair of hubs, each roller wheel having a radial face connected to the flange portion of its respective hub and an outer cylindrical housing (76) symmetrical with the shaft axis (46) defining an outer peripheral surface (82) having an elastomeric coating (84) bonded thereon configured to engage the inner surface of the endless track belt. Each mid-roller also has a pair of non-metallic, ring-shaped reduced-friction guides (90). Each roller wheel has one of said reduced-friction guides mounted thereon such that the reduced-friction guide interacts with the track guide blocks such that the reduced-friction guide is configured to be the point of contact between the mid-roller and the track guide blocks.

8 Claims, 5 Drawing Sheets

(58) Field of Classification Search
USPC .................................................. 305/137, 194
See application file for complete search history.

(56) References Cited

U.S. PATENT DOCUMENTS

| | | | | |
|---|---|---|---|---|
| 5,171,074 | A * | 12/1992 | Seksaria | ................. B60B 3/042 |
| | | | | 301/64.304 |
| 6,206,492 | B1 | 3/2001 | Moser | |
| 6,299,264 | B1 | 10/2001 | Kautsch et al. | |
| 7,137,675 | B1 * | 11/2006 | Simula | ............... B62D 55/0966 |
| | | | | 305/194 |
| 8,398,182 | B2 * | 3/2013 | Simula | ................. B62D 55/145 |
| | | | | 305/193 |
| 8,419,139 | B2 * | 4/2013 | Kaufold | ................. C23C 28/00 |
| | | | | 305/137 |
| 9,033,431 | B1 * | 5/2015 | Zuchoski | ............... B62D 55/14 |
| | | | | 305/130 |
| 2003/0160506 | A1 | 8/2003 | Averkamp et al. | |
| 2005/0104449 | A1 | 5/2005 | Lavoie et al. | |
| 2007/0247002 | A1 | 10/2007 | Huntimer et al. | |
| 2016/0031500 | A1 * | 2/2016 | Renson | ............... B62D 55/145 |
| | | | | 305/136 |

OTHER PUBLICATIONS

European Patent Office, International Search Report for Parent International Application No. PCT/US2016/017290, dated Apr. 20, 2016.

* cited by examiner

MID-ROLLER WITH REDUCED-FRICTION GUIDE

RELATED APPLICATION

Under provisions of 35 U.S.C. § 119(e), Applicant claims the benefit of U.S. Provisional Application No. 62/114,130, entitled MID-ROLLER WITH REDUCED-FRICTION GUIDE and filed Feb. 10, 2015.

BACKGROUND OF THE INVENTION

Field of Invention

This invention relates generally to a supporting mid-roller for the undercarriage of an endless track work machine and more particularly to a mid-roller having a reduced-friction guide positioned between the guide blocks of an endless track and an inner shoulder of the mid-roller.

Description of Related Art

A typical rubber-tracked work machine utilizes a propulsion system in which a continuous flexible rubber belt is frictionally driven as it is entrained about a pair of wheels. The work machines are configured to maintain adequate tension on the endless belt around the entrained wheels, and to keep the belt in lateral alignment with the wheels when the wheels are subject to large lateral loads. Tracked work machines utilize multiple mid-rollers to distribute the vehicle's weight within the track and to help constrain the track from sliding off the wheels laterally. Typical mid-rollers utilize a steel or iron wheel with an elastomer bonded to the outside surface to provide cushioning and debris rejection. The inside metal edge of the mid-roller provides a contact surface to engage rubber track guide blocks on the inside surface of the endless belt whenever the track wanders laterally from center.

A common problem with endless track work machines utilizing continuous flexible rubber belts is heat. Heat is generated when the rubber belts come into contact with other drive components, such as the supporting mid-rollers, the drive wheel and the idler wheel. This is most prevalent with the supporting mid-rollers because of the speed at which they rotate in contrast to the drive and idler wheels, due to the supporting mid-roller generally being smaller in diameter.

High speed roading and field operation on slopes are two typical conditions that result in significant rubbing of the mid-roller edges with the track guide blocks. Due to the friction created between the edge of a steel or iron mid-roller and a rubber track guide block, substantial heat may be generated in both the midroller and guideblocks from this sliding contact. U.S. Pat. No. 6,299,264 issued to Kautsch et al. describes a mid-roller having a heat shield that is positioned between mid-roller segments and the guide blocks. The heat shield is intended to insulate the midroller from the heat generated by metal-to-rubber contact with the guide blocks. However, this design does nothing to reduce the amount heat that is also built up in the guide blocks. Since excess heat can quickly deteriorate the bond between mid-roller wheels and their elastomer coating, in addition to deteriorating the rubber guide blocks, it would be desirable to reduce the overall friction from this interface.

OVERVIEW OF THE INVENTION

In one embodiment, the invention is directed to a tracked work machine having a track roller assembly. The track roller assembly includes a drive wheel, an idler wheel, and an endless track belt disposed about the drive and idler wheels. The endless track belt is at least in part made of a rubber material and defines an inner surface, a ground contacting or outer surface, and a pair of edges. The endless track belt has a plurality of track guide blocks positioned on the inner surface and centrally located between the pair of edges on a track center axis.

The track roller assembly also has a plurality of supporting mid-rollers located between the drive wheel and the idler wheel and configured to engage the plurality of guide blocks to aid in maintaining alignment of the endless track belt. Each mid-roller has a cylindrical shaft defining a shaft axis extending to outer ends of the shaft and a pair of hubs assembled about the cylindrical shaft, each hub having a cylindrical housing with a flange portion projecting radially outward from the shaft axis. Each mid-roller also has a pair of metallic roller wheels mounted on the pair of hubs, each roller wheel having a radial face connected to the flange portion of its respective hub and an outer cylindrical housing symmetrical with the shaft axis defining an outer peripheral surface having an elastomeric coating bonded thereon configured to engage the inner surface of the endless track belt. Each roller wheel further defines an inner shoulder having a recess formed therein. Each mid-roller also has a pair of non-metallic, ring-shaped reduced-friction guides. Each roller wheel has one of said reduced-friction guides pressed into the recess on the inner shoulder of the roller wheel such that the reduced-friction guide interacts with the track guide blocks such that the reduced-friction guide is configured to be the frictional point of contact between the mid-roller and the plurality of track guide blocks.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
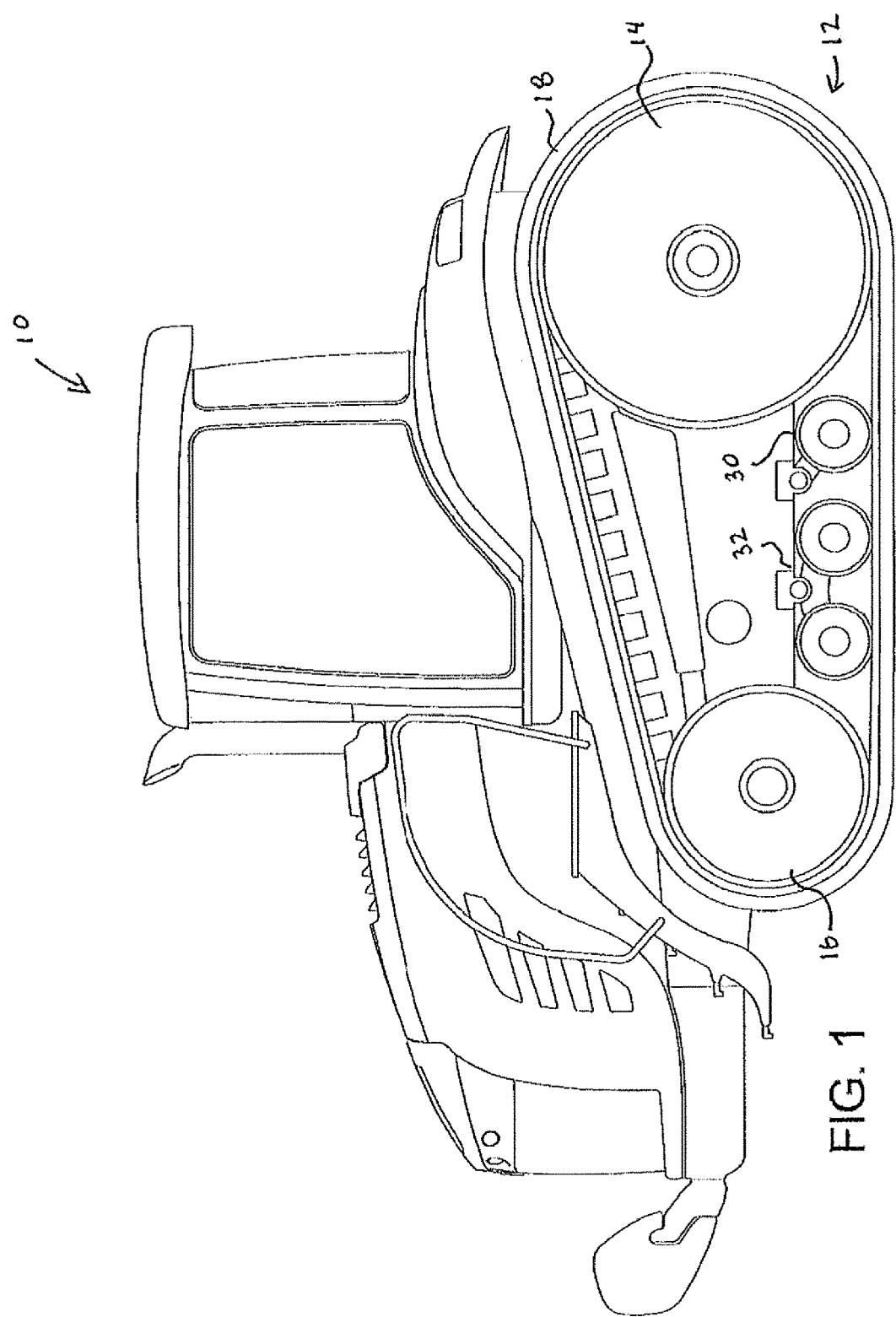
FIG. 1 is a side elevational view of a work machine embodying the present invention.

Referring initially to FIG. 1, a work machine 10 has a pair of track roller assemblies 12, only one shown, configured to drive the work machine over ground. Each track roller assembly 12 includes a drive wheel 14 and an idler wheel 16 with an endless rubber track belt 18 disposed about the drive and idler wheels 14, 16. In as much as the track roller assemblies 12 are substantially structurally and operatively similar, further reference will be made to only a single side of the work machine 10. In this example, an engine (not shown) powers the drive wheel 14, in a conventional manner, and frictionally drives each of the endless rubber belts 18. Located between the drive wheel 14 and the idler wheel 16 is a plurality of supporting mid-rollers 30. The mid-rollers 30 are attached to a track roller frame 32 in any manner known in the art. The work machine 10, for example, is an agricultural tractor positioning the drive wheel 14 near the back and the idler wheel 16 toward the front of the work machine 10.

Figure 2:
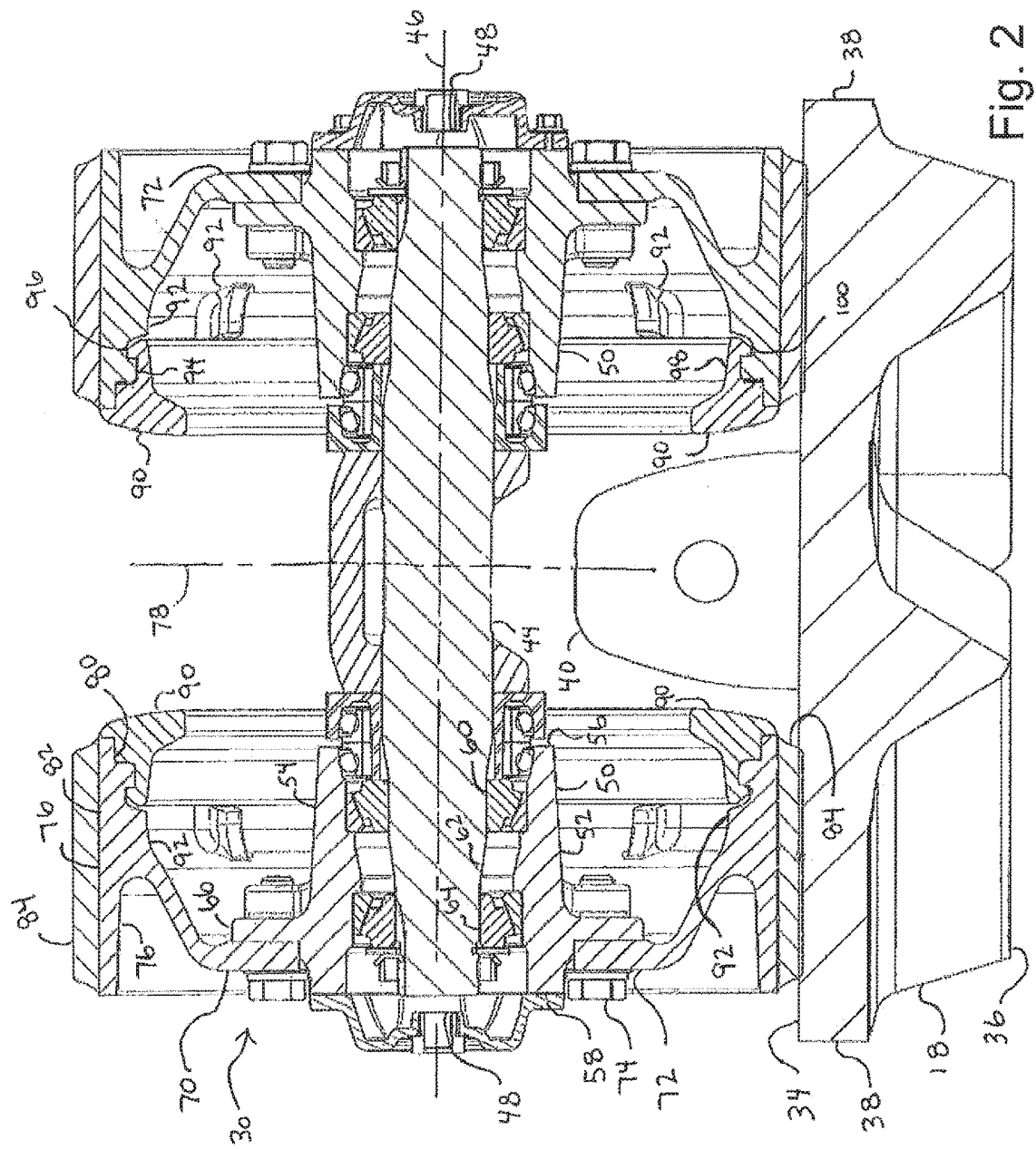
FIG. 2 is an enlarged sectional view of a mid-roller of the present invention taken along line A-A of FIG. 1.

Referring now to FIG. 2, the endless rubber belt 18 defines an inner surface 34, a ground contacting or outer surface 36, and a pair of edges 38. Positioned on the inner surface 34 and centrally located between the pair of edges 38 is a plurality of guide blocks 40.

Each mid-roller 30 includes a cylindrical shaft 44 defining an axis 46 extending to outer ends 48. Assembled about the cylindrical shaft 44 is a pair of hubs 50 being symmetrical with the axis 46 of the cylindrical shaft 44. Each hub 50 includes a cylindrical housing 52 spaced from the axis 46 a predetermined distance and defining an outer surface 54. The cylindrical housing 52 defines a first end 56 positioned inwardly of the respective one of the outer ends 48 of the shaft 42 and a second end 58 positioned outwardly of the same respective one of the outer ends 48. Progressing from the first end 56 to the second end 58 is a first bearing 60, a spacer 62 and a second bearing 64. Spaced inwardly and projecting radially outward from the second end 58 is a flange portion 66 having a plurality of holes positioned therein. Positioned at the second end 58 of each cylindrical housing 52 is a roller wheel 70. Each roller wheel 70 has a radial face 72. A plurality of fasteners 74 connects the respective roller wheel 70 using the holes in the flange portion 66 of the hub 50. An outer cylindrical housing 76, symmetrical with the axis 46, extends axially inwards from the radial face 72 towards a center axis 78 of the mid-roller 30 and forms an inner shoulder 80. The outer cylindrical housing 76 has an outer peripheral surface 82. An elastomeric coating 84, for example rubber, is bonded to the outer peripheral surface 82.

Figure 3:
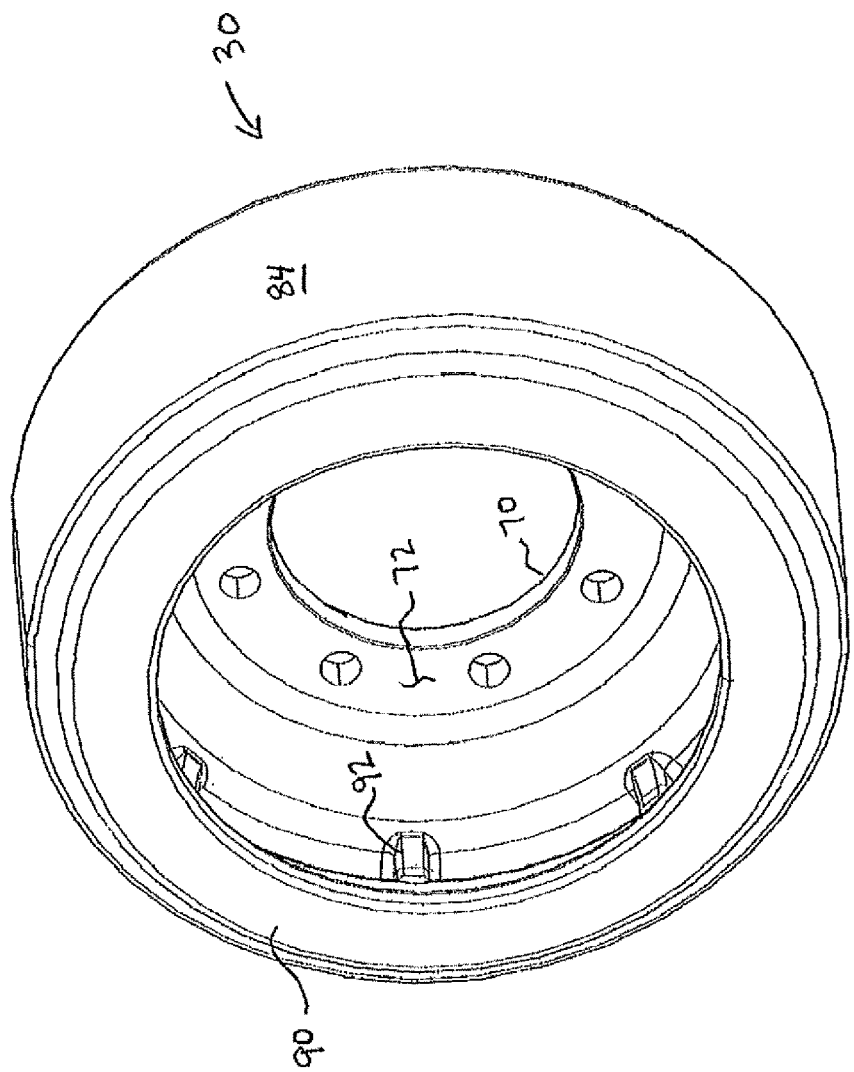
FIG. 3 is a perspective view of a roller wheel with a reduced-friction guide.
Figure 4:
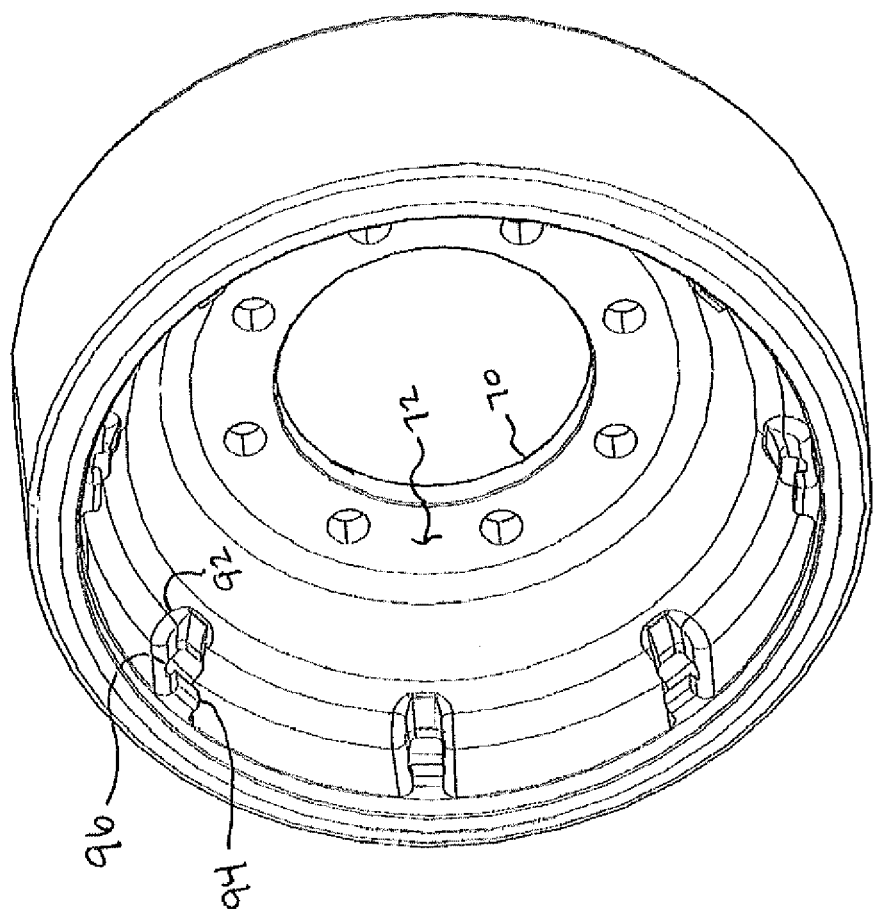
FIG. 4 is perspective view of the roller wheel with the reduced-friction guide removed.
Figure 5:
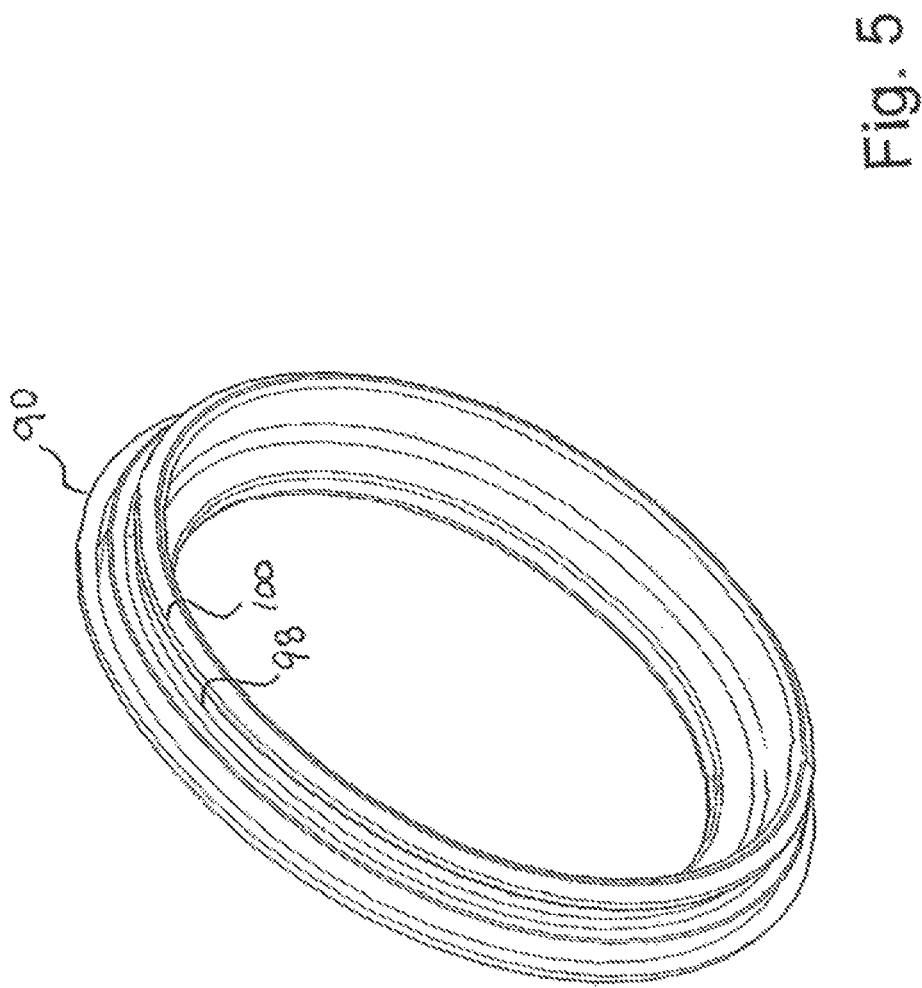
FIG. 5 is a perspective view of the reduced-friction guide.

Turning also now to FIGS. 3-5, according to the invention, a ring-like, reduced-friction guide 90 is mounted to the portion of the roller wheel 70 interacting with the track guide blocks 40. In one embodiment, the reduced-friction guide 90 is pressed into a cast or machined recess on the inner shoulder 80 of the roller wheel 70. The reduced-friction guide 90 is configured to be the point of contact between the mid-roller 30 and the track guide blocks 40 during high speed roading and field operation on slopes, which result in significant rubbing of the mid-roller 30 with the track guide blocks 40.

In one desirable embodiment, the roller wheel 70 has a plurality of ribs 92 extending radially inward from the outer cylindrical housing 76. Each rib 92 has a step 94 formed in an inward surface with a recess 96 behind the step 94. The reduced-friction guide 90 has a circumferential tongue 98 with a catch 100 at the end of the tongue 98. The reduced-friction guide 90 is pressed against the inward shoulder 80 such that the tongue 98 deflects over the step 94 in each rib 92 causing the catch 100 to snap fit into the recess 96. However, one skilled in the art will understand that the reduced-friction guide 90 could be held into place by other methods, such as bonding or mechanical fastening.

The reduced-friction guide 90 is made of a non-metallic material dissimilar with the material of the roller wheel 70. Desirably, the reduced-friction guide 90 is molded of plastic. As is customary in the art, the roller wheel 70 is desirably made of steel or iron. Due to the friction created between the mid-roller 30 and the rubber track guide block 40, heat is generated from the sliding contact. Based on the assumption that the coefficient of friction between smooth steel or iron and rubber is approximately 0.5 and that some non-metallic materials can achieve a coefficient of friction of approximately 0.15 with rubber, adding the reduced-friction guide 90 of non-metallic material can reduce heat generation from the sliding friction. Desirably, the non-metallic material is a plastic material having good heat and abrasion-resisting properties. One suitable plastic material for the reduced-friction guide 90 is Ultra High Molecular Weight Polyethylene (UMHW-PE).

An additional benefit of the reduced-friction guide 90 is that the thermal properties of non-metallics (plastics) tend to be poor conductors of heat, compared to metals. Therefore, whatever heat may be generated by the reduced-friction guide 90 will be slow to propagate to the metal roller wheel 70 and its elastomeric coating 84.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A tracked work machine having a track roller assembly comprising:
   a drive wheel;
   an idler wheel;
   an endless track belt disposed about the drive and idler wheels, the endless track belt at least in part made of a rubber material and defining an inner surface, a ground contacting or outer surface, and a pair of edges, wherein the endless track belt comprises a plurality of track guide blocks positioned on the inner surface and centrally located between the pair of edges on a track center axis;
   a plurality of supporting mid-rollers located between the drive wheel and the idler wheel and configured to engage the plurality of guide blocks to aid in maintaining alignment of the endless track belt, each mid-roller comprising:
      a cylindrical shaft defining a shaft axis extending to outer ends of the shaft;
      a pair of hubs assembled about the cylindrical shaft, each hub having a cylindrical housing with a flange portion projecting radially outward from the shaft axis;
      a pair of metallic roller wheels mounted on the pair of hubs, each roller wheel having a radial face connected to the flange portion of its respective hub and an outer cylindrical housing symmetrical with the shaft axis defining an outer peripheral surface having an elastomeric coating bonded thereon configured to engage the inner surface of the endless track belt, wherein each roller wheel further defines an inner shoulder having a recess formed therein wherein the roller wheel has a plurality of ribs extending radially inward from the outer cylindrical housing, with each rib having a step formed in an inward surface; and a pair of non-metallic, ring-shaped reduced-friction guides, wherein each roller wheel has one of said reduced-friction guides pressed into the recess on the inner shoulder of the roller wheel with a snap fit engagement with the plurality of ribs such that the reduced-friction guide interacts with the track guide blocks such that the reduced-friction guide is configured to be the frictional point of contact between the mid-roller and the plurality of track guide blocks.

2. The tracked work vehicle of claim 1 wherein the hub and reduced-friction guide are symmetrical about the axis of the cylindrical shaft.

3. The tracked work vehicle of claim 1 wherein the reduced-friction guide comprises a pre-formed plastic piece adapted to be snap-fit into the recess on the inner shoulder of the roller wheel.

4. The tracked work vehicle of claim 1 wherein the reduced-friction guide is molded of plastic and the roller wheel is made of either steel or iron.

5. The tracked work vehicle of claim 4 wherein the reduced-friction guide is made of Ultra High Molecular Weight Polyethylene (UMHW-PE).

6. The tracked work vehicle of claim 1 wherein the outer cylindrical housing of each roller wheel has an inner peripheral surface, the inner shoulder defined on the inner peripheral surface.

7. A tracked work machine having a track roller assembly comprising:
    a drive wheel;
    an idler wheel;
    an endless track belt disposed about the drive and idler wheels, the endless track belt at least in part made of a rubber material and defining an inner surface, a ground contacting or outer surface, and a pair of edges, wherein the endless track belt comprises a plurality of track guide blocks positioned on the inner surface and centrally located between the pair of edges on a track center axis;
    a plurality of supporting mid-rollers located between the drive wheel and the idler wheel and configured to engage the plurality of guide blocks to aid in maintaining alignment of the endless track belt, each mid-roller comprising:
        a cylindrical shaft defining a shaft axis extending to outer ends of the shaft;
        a pair of hubs assembled about the cylindrical shaft, each hub having a cylindrical housing with a flange portion projecting radially outward from the shaft axis;
        a pair of metallic roller wheels mounted on the pair of hubs, each roller wheel having a radial face connected to the flange portion of its respective hub and an outer cylindrical housing symmetrical with the shaft axis defining an outer peripheral surface having an elastomeric coating bonded thereon configured to engage the inner surface of the endless track belt, wherein each roller wheel further defines an inner shoulder having a recess formed therein, wherein the roller wheel has a plurality of ribs extending radially inward from the outer cylindrical housing and each rib has a step formed in an inward surface with a second recess behind the step; and
        a pair of non-metallic, ring-shaped reduced-friction guides, wherein each roller wheel has one of said reduced-friction guides pressed into the recess on the inner shoulder of the roller wheel such that the reduced-friction guide interacts with the track guide blocks such that the reduced-friction guide is configured to be the frictional point of contact between the mid-roller and the plurality of track guide blocks, and the reduced-friction guide has a circumferential tongue with a catch at the end of the tongue, the tongue configured to deflect over the step in each rib causing the catch to snap fit into the second recess when the reduced-friction guide is pressed against the inner shoulder.

8. The tracked work vehicle of claim 7 wherein the second recesses and the ribs of each roller wheel act to secure the reduced-friction guide both axially and laterally on the roller wheel.

* * * * *